United States Patent
Stemmle et al.

(10) Patent No.: US 8,897,845 B2
(45) Date of Patent: Nov. 25, 2014

(54) ARRANGEMENT FOR ELECTRICALLY CONDUCTIVELY CONNECTING TWO ELECTRICAL UNITS

(75) Inventors: Mark Stemmle, Hannover (DE); Erik Marzahn, Langenhagen (DE)

(73) Assignee: NEXANS, Paris (FR)

( * ) Notice: Subject to any disclaimer, the term of this patent is extended or adjusted under 35 U.S.C. 154(b) by 597 days.

(21) Appl. No.: 13/186,606

(22) Filed: Jul. 20, 2011

(65) Prior Publication Data

US 2012/0295792 A1 Nov. 22, 2012

(30) Foreign Application Priority Data

Aug. 13, 2010 (EP) ..................................... 10305887

(51) Int. Cl.
 *H01B 12/16* (2006.01)
 *H01B 12/14* (2006.01)
 *H02G 15/34* (2006.01)
 *H02J 3/36* (2006.01)

(52) U.S. Cl.
 CPC ....... *H02G 15/34* (2013.01); *H02J 3/36* (2013.01); *Y02E 40/648* (2013.01); *H01B 12/16* (2013.01); *Y02E 60/60* (2013.01); *Y02E 40/60* (2013.01); *H01B 12/14* (2013.01); *Y10S 505/886* (2013.01); *Y10S 505/899* (2013.01)
 USPC ........... 505/163; 505/230; 505/886; 505/899; 174/125.1; 62/50.7; 62/51.1

(58) Field of Classification Search
 CPC ........ H01B 12/02; H01B 12/16; H01B 12/06; F25B 9/00; F25B 19/00; F25B 19/005; H01L 39/14
 USPC ........ 505/163, 230, 232, 884–888, 898, 899; 174/15.4, 15.5, 125.1; 29/599; 62/50.7, 62/51.1; 307/147
 See application file for complete search history.

(56) References Cited

U.S. PATENT DOCUMENTS

| 6,262,375 B1 * | 7/2001 | Engelhardt et al. ........ 174/125.1 |
| 2006/0180328 A1 * | 8/2006 | Masuda et al. ............... 174/15.5 |

* cited by examiner

*Primary Examiner* — Stanley Silverman
*Assistant Examiner* — Kallambella Vijayakumar
(74) *Attorney, Agent, or Firm* — Sofer & Haroun, LLP

(57) ABSTRACT

An arrangement for electrically conductively connecting two electrical units by means of a bipolar high voltage direct current transmission, in which between the units are arranged at least two electrical direct current cables constructed as superconductive cables. The superconductive cables are mounted separately from each other in a cryostat (1,2) suitable for conducting a cooling agent which has at least one metal pipe provided with a thermal insulation. The cryostats (1,2) are connected with at least one of their ends to a cooling plant (7) supplying the cooling agent and a pipeline (3) is placed parallel to the two cryostats (1,2). The pipeline (3) is connected at both its ends to the two cryostats (1,2) through valves (15,16,17) which are closed during uninterrupted operation and, in the case of an interruption at one of the superconductive cables, the pipeline (3) serves with the then open valves for conducting the cooling agent intended for the cryostat of the impaired cable.

3 Claims, 2 Drawing Sheets

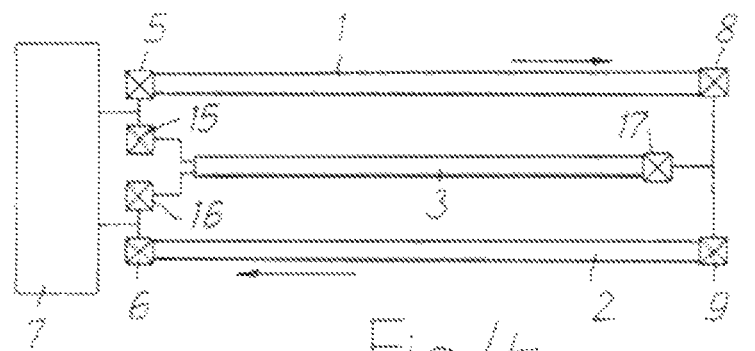
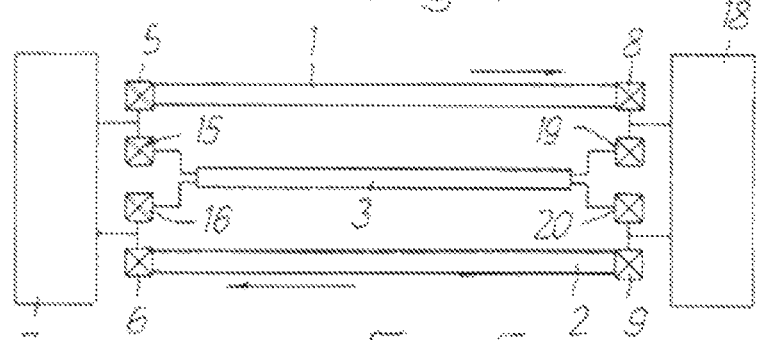
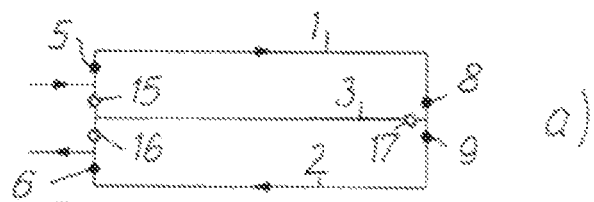
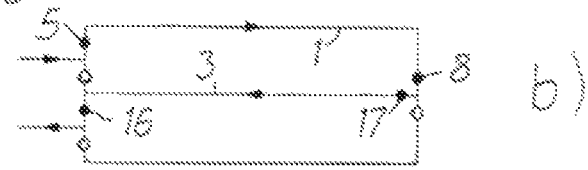
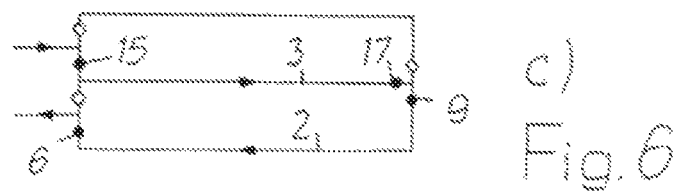

ARRANGEMENT FOR ELECTRICALLY CONDUCTIVELY CONNECTING TWO ELECTRICAL UNITS

RELATED APPLICATION

This application claims the benefit of priority from European Patent Application No. 10 305 887.1, filed on Aug. 13, 2010, the entirety of which is incorporated by reference.

BACKGROUND

1. Field of the Invention

The invention relates to an arrangement for electrically conductively connecting two electrical units by means of a bipolar high voltage direct current transmission in which at least two electrical direct current cables are arranged between the units.

"Electrical unit" in the sense of the invention may be, for example, a current supply network, a power station, a transforming station, a resetting station, as well as also sections within such units. In the following, representative for all possibilities of application, the word "network" is used instead of the words "electrical unit."

2. Description of Related Art

In today's technology, such arrangements are used in so-called energy networks in order to realize a two-point connection with a high transmission power, as it is necessary, when a power station is connected to a network. Using such an arrangement, it is also possible to connect different networks to each other by means of bipolar high voltage direct current transmission. This is basically true for all networks existing on Earth which as three-phase current networks can also offer different frequencies. The networks can also be connected to each other over longer distances. The direct current cables used in the known technology are prone to losses. In this connection, on the one hand, the level of the losses of the direct current cable increases linearly with the distance between the respective networks and, on the other hand, relative to the square of the power being transmitted. Therefore, it must be ensured that an electrically conducting cross-section sufficient for all cases is available using the appropriate efforts. This can be achieved with conventional technology by a parallel displacement of an appropriate number of direct current cables.

OBJECTS AND SUMMARY

The invention is based on the object of constructing the above-described arrangement in such a way that the transmission security of the direct current can be achieved more simply.

In accordance with the invention, this object is met in that
the direct current cables are constructed as superconductive cables which separately from each other are arranged in a cryostat suitable for conducting a cooling agent which includes at least one metal pipe provided with a thermal insulation,
the two cryostats are connected at least at one of their ends to a cooling plant which supplies the cooling agent,
parallel to the two cryostats is placed a pipeline,
the pipeline is connected at both its ends to both cryostats through valves which are closed when the operation is uninterrupted, and
that, in the case of an interruption in one of the superconductive cables the pipeline her with the then open valves serves for conducting the cooling agent intended for the cryostat of the impaired cable.

In today's technology, superconductive cables have electrical conductors of a composite material which contains ceramic material that changes into the superconductive state in sufficiently low temperatures. The electrical direct current resistance of a correspondingly constructed conductor is zero with sufficient cooling as long as a certain current strength is not exceeded. Suitable ceramic materials are, for example, BSCCO (bismuth-strontium-calcium-copper oxide) as material of the first generation or ReBCO (rare-earth-barium-copper oxide), particularly YBCO (yttrium-barium-copper oxide), as materials of the second generation. Sufficiently low temperatures for bringing such a material into the superconductive state are, for example, between 67K and 90K. Suitable cooling agents are, for example, nitrogen, helium, neon and hydrogen or mixtures of these materials.

Since the superconductive direct current cables conduct the current in the case of uninterrupted operation without losses, two direct current cables are sufficient independently of the length of the transmission distance. In addition, the superconductive direct current cables can be adapted relatively simply to the desired level of the power to be transmitted by adjusting the quantity of the superconductive material contained in the cable. The parallel pipeline provides an increased safety for the transmission of the direct current at least for a sufficient duration, because in the case of failure of one of the direct current cables a cooling agent circulation is maintained, for example, from the cooling plant to the remote end and back to the cooling plant through the pipeline so that the operative direct current cable can be continued to be operated without restriction.

In this connection, the current path can be closed through ground or it is possible to additionally place a normally conductive cable parallel to the two superconductive direct current cables which cable produces if necessary a current path parallel to ground.

A superconductive direct current cable can also be arranged in the pipeline which can replace one of the failed direct current cables after appropriate cooling.

BRIEF DESCRIPTION OF THE DRAWINGS

Embodiments of the subject matter of the invention are illustrated in the drawings.

In the drawing:

FIGS. 4 and 5 show the arrangement according to the invention in two different embodiments in principal configuration, FIG. 6 shows three different states of operation of the arrangement according to FIG. 4.

DETAILED DESCRIPTION

Figure 1:
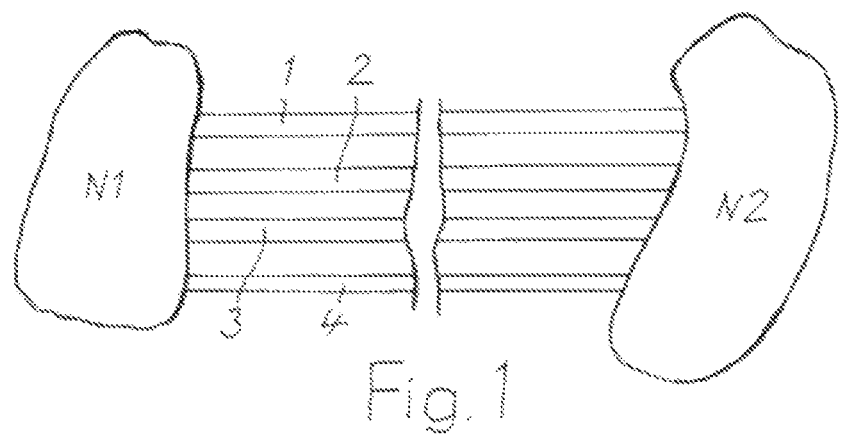
FIG. 1 is a schematic illustration showing two networks connected by means of an arrangement according to the invention.
Figure 2:
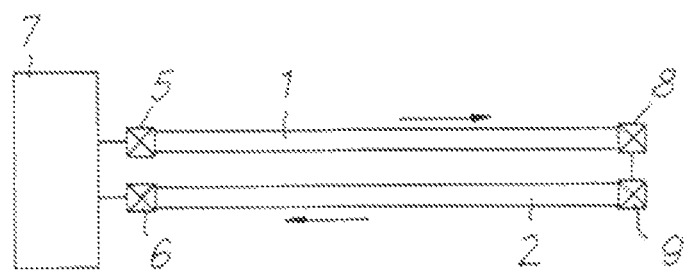
FIG. 2 is another schematic illustration showing two cryostats containing superconductive cable connected to a cooling plant.

N1 and N2 denote two electrical units—in the following called "networks" for short—which are electrically conductively connected with each other. For this purpose in the illustrated embodiment, two cryostats 1 and 2 are arranged between the two networks N1 and N2, wherein the configuration of the cryostats is, for example, shown in FIG. 3. Each cryostat is arranged with a circumferentially closed superconductive direct current cable SK—in the following called "cable SK" for short—, a pipeline 3 and a normally conductive electrical cable 4. The electrically conductive connection of the cables SK to the networks N1 and N2 is part of the prior art, and, therefore, will not be discussed herein. During the operation of the arrangement, the cables SK are in the superconductive state. This is achieved by immersing them in a cooling agent which is conducted through the respective cryostat 1 or 2. In accordance with FIG. 2, the cryostats 1 and 2 are connected, for example, at their near ends through valves 5 and 6 to a cooling plant 7. For realizing a circulation of the cooling agent with a return flow to the cooling plant 7, the two cryostats 1 and 2 are connected to each other at their remote ends through valves 8 and 9. In the case of uninterrupted operation of the arrangement, the valves 5 and 6 as well as 8 and 9 are open. The cooling agent can then flow, for example, in accordance with the arrows shown in FIG. 2 through the cryostat 1 in one direction and through the cryostat 2 in the opposite direction.

Figure 3:
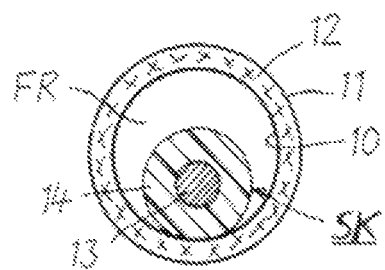
FIG. 3 is a cross-section of a cryostat with the superconductive direct current cable placed therein.

Each of the two cryostats 1 and 2 is composed, as shown in FIG. 3, for example, both of metal pipes 10 and 11 arranged concentrically and at a distance from each other, wherein a vacuum insulation 12 is arranged between the pipes. The pipes 10 and 11 may be undulated transversely of their longitudinal direction. In each cryostat 1 and 2 is located a superconductive cable SK which includes a superconductor 13 surrounded by a dielectric 14. The free space FR remaining in each cryostat 1 or 2 serves for conducting the cooling agent therethrough.

As long as the operation of the arrangement is uninterrupted, the two cryostats 1 and 2 with the cables SK contained therein are basically sufficient for the electrically conductive connection of the networks of N1 and N2. For safety reasons the pipeline 3 is in this arrangement connected between the two networks N1 and N2 parallel to the cryostats 1 and 2, wherein, in case of failure of one of the cables SK the pipeline 3 is connected for maintaining the cooling agent circulation to the cryostat of the still functioning cable SK. For this purpose, the pipeline 3 is advantageously thermally insulated. It can basically be constructed in the same manner as the two cryostats 1 and 2.

The pipeline 3 is connected in the arrangement according to FIG. 4 at the near end through valves 15 and 16 which can be arranged in the corresponding pipe connections to the valve 5, on the one hand, and at the valve 6 on the other hand. At the remote end, the pipeline 3 is connected through a valve 17 mounted in the pipe connection to the valves 8 and 9 of the cryostats 1 and 2. During uninterrupted operation of the arrangement, the valves 15, 16 and 17 are closed. This arrangement operates with a cooling agent circulation which starts from the cooling plant 7 and leads back to the cooling plant 7 through the cryostat 1 in the one direction and the cryostat 2 in the other direction.

In the embodiment of the arrangement according to FIG. 5, a cooling plant each is used at the two ends of the cryostats 1 and 2. For example, the cooling plant 7 supplies the cooling agent for example, to the cryostat 1 from where the cooling agent is returned for recooling the second cooling plant 18 at the other end of the cryostat 1. Analogously, the cryostat 2 is supplied with cooling agent, for example, by the cooling plant 18. Also in this embodiment of the arrangement, the cooling agent can be redirected if required to the pipeline 3. For this purpose the pipeline 3 is connected at the end of the second cooling plant 18 through a valve 19 to the valve 8 of the cryostat 1 and is connected through a valve 20 to the valve 9 of the cryostat 2. The valves 19 and 20 are mounted in corresponding pipe connections. They are closed during uninterrupted operation.

The manner of operation of the arrangement according to the invention in accordance with FIG. 4 will be explained with the aid of FIG. 6:

In FIG. 6a, the arrangement is illustrated during unimpeded operation in accordance with FIG. 4. The valves 5 and 6 as well as 8 and 9 which are now open, are denoted by a dot, while a circle is shown for each closed valve 15, 16 and 17. The cooling agent circulation is indicated by arrows.

If, for example, the cable SK in the cryostat 2 fails, its valves 6 and 9 are closed and simultaneously the valves 16 and 17 of the pipeline 3 are open, as illustrated in FIG. 6b. The cooling agent circulation is then closed in accordance with the arrows shown in the drawing.

FIG. 6c shows the other case in which the cable SK of the cryostat 1 has failed. In that case, the valves 5 and 8 are then closed and the valves 15 and 17 of the pipeline 3 are open. The cooling agent circulation takes place in accordance with the indicated arrows. With some further effort, the direction of the cooling agent circulation could also be reversed, so that the cryostat 2 is directly connected to the cooling plant 7.

The arrangement can be continued to be operated, by using the pipeline 3 and the cooling agent circulation maintained as a result without substantial restrictions, however, with a power reduction of about 50%. In this case, it is sufficient if the current path is closed over ground. However, on the other hand, it is also possible to use the electrical cable 4 as parallel path to ground simultaneously with the switching on of the pipeline 3.

It is also possible to provide in the pipeline 3 a further superconductive cable SK which, after switching on the pipeline 3, is immersed in cooling agent and is thereby cooled after an appropriate period of time to the superconductive state. Subsequently, the pipeline 3 equipped in this manner can fully replace the cryostat with the failed cable SK.

The invention claimed is:

1. Arrangement for electrically conductively connecting two electrical units by a bipolar high voltage direct current transmission, in which at least two electrical direct current cables are arranged between the units, wherein:
    the direct current cables are constructed as superconductive cables which are each arranged separately from each other in a cryostat suitable for conducting a cooling agent, wherein each cryostat includes at least one metal pipe provided with a thermal insulation and wherein said cooling agent flows in one direction to one of the cryostats and in the opposite direction in the other cryostat;
    a pipeline is placed parallel to the cryostats;
    the pipeline is connected at its both ends through valves to both cryostats, wherein the valves are closed during uninterrupted operation, and
    in the case of an interruption at one of the superconductive cables, the pipeline serves for conducting the cooling agent determined for the cryostat of the impeded cable with the valves then being open.

2. Arrangement according to claim 1, wherein the pipeline is thermally insulated.

3. Method for operating an arrangement according to claim 1, wherein
    the cooling agent is conducted in one of the cryostats from the cooling plant supplying the cooling agent to the remote end, and in the other cryostat, from the remote end, where both cryostats are connected to each other back to the cooling plant;

the two cryostats are connected to each other at their near ends through a valve each to the cooling plant and are connected to each other at their remote ends through two successively arranged valves, wherein all valves are open during uninterrupted operation; and a pipeline is placed parallel to the cryostats which are connected through valves which are closed through uninterrupted operation to the valves of the cryostats.

\* \* \* \* \*